(12) United States Patent
Lee

(10) Patent No.: US 9,906,694 B2
(45) Date of Patent: Feb. 27, 2018

(54) CAMERA MODULE HAVING A DUST TRAP

(71) Applicant: LG Innotek Co., Ltd., Seoul (KR)

(72) Inventor: Jung Sik Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/148,540

(22) Filed: May 6, 2016

(65) Prior Publication Data

US 2016/0255252 A1    Sep. 1, 2016

Related U.S. Application Data

(63) Continuation of application No. 14/348,774, filed as application No. PCT/KR2012/007917 on Sep. 28, 2012, now Pat. No. 9,338,337.

(30) Foreign Application Priority Data

Sep. 30, 2011 (KR) .................. 10-2011-0099855
Sep. 30, 2011 (KR) .................. 10-2011-0099857
Sep. 30, 2011 (KR) .................. 10-2011-0099859

(51) Int. Cl.
*H04N 5/225* (2006.01)
*H04N 3/14* (2006.01)
*G03B 17/08* (2006.01)

(52) U.S. Cl.
CPC ........... *H04N 5/2252* (2013.01); *G03B 17/08* (2013.01); *H04N 5/2253* (2013.01); *H04N 5/2254* (2013.01); *H04N 5/2257* (2013.01)

(58) Field of Classification Search
CPC .................... H04N 5/2257; H04N 5/2252
USPC .................... 348/294, 335, 340, 373, 374
See application file for complete search history.

(56) References Cited

U.S. PATENT DOCUMENTS

2010/0110270 A1* 5/2010 Sekimoto ............ H04N 5/2254
                                                        348/340
2011/0141338 A1* 6/2011 Lee ..................... H04N 5/2251
                                                        348/342
2013/0027600 A1* 1/2013 Pavithran ............ H04N 5/2171
                                                        348/335

FOREIGN PATENT DOCUMENTS

| CN | 101014092 A | 8/2007 |
| CN | 101738705 A | 6/2010 |
| EP | 1918750 A1 | 5/2008 |
| JP | 2009-116176 A | 5/2009 |

(Continued)

OTHER PUBLICATIONS

International Search Report in International Application No. PCT/KR2012/007917, filed Sep. 28, 2012.

(Continued)

*Primary Examiner* — Sinh Tran
*Assistant Examiner* — Selam Gebriel
(74) *Attorney, Agent, or Firm* — Saliwanchik, Lloyd & Eisenschenk

(57) ABSTRACT

The present invention relates to a camera module, the camera module including a base supporting a filter member mounted on a position corresponding to that of an image sensor mounted on a PCB (Printed Circuit Board), a dust trap unit mounted about the filter member of the base to collect soils including dust introduced into the filter member, wherein the dust trap unit includes an epoxy reception groove formed with one or more ribs formed at a periphery of the filter member mounted at the base, and a dust trap epoxy coated on an inside of the epoxy receptin groove.

20 Claims, 6 Drawing Sheets

(56) References Cited

FOREIGN PATENT DOCUMENTS

| | | |
|---|---|---|
| JP | 2009-175343 A | 8/2009 |
| JP | 2010-134409 A | 6/2010 |
| JP | 2011-155414 A | 8/2011 |
| KR | 100738380 B1 | 7/2007 |
| KR | 10-0919117 B1 | 9/2009 |
| KR | 10-2010-0022692 A | 3/2010 |
| KR | 10-2010-0131778 A | 12/2010 |
| KR | 10-2011-0068504 A | 6/2011 |
| KR | 20-2011-0008478 U | 8/2011 |

OTHER PUBLICATIONS

Office Action dated May 19, 2016 in Chinese Application No. 201280048087.9.
Office Action dated Apr. 27, 2017 in Korean Application No. 10-2011-0099857.
Office Action dated May 4, 2017 in Korean Application No. 10-2011-0099859.
Office Action dated May 4, 2017 in Korean Application No. 10-2011-0099855.
Office Action dated Oct. 25, 2017 in Korean Application No. 10-2011-0099859.
Office Action dated Oct. 26, 2017 in Korean Application No. 10-2011-0099857.

* cited by examiner

[Figure 6]
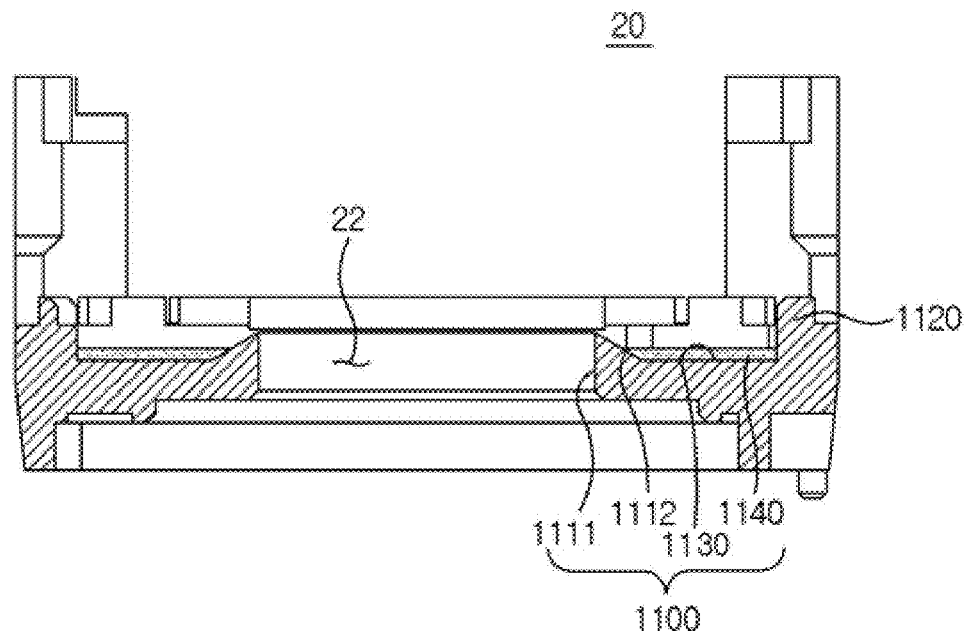
[Figure 7]
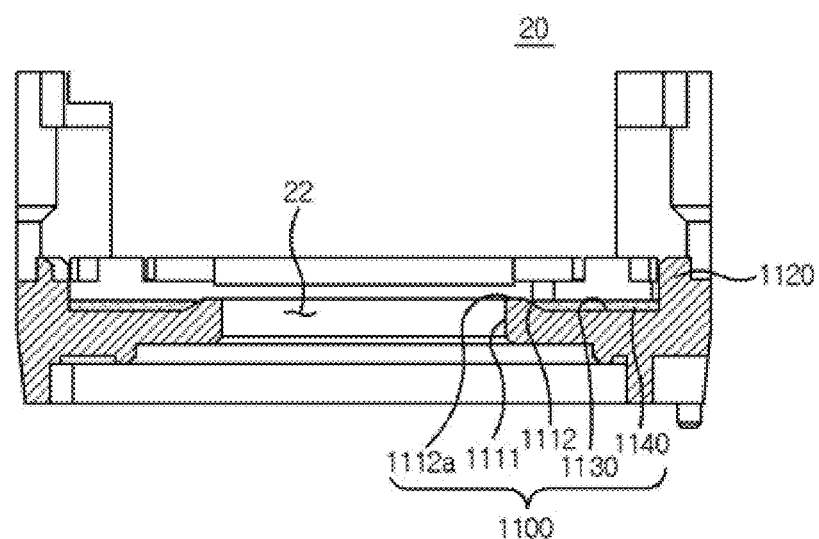

CAMERA MODULE HAVING A DUST TRAP

CROSS-REFERENCE TO RELATED APPLICATIONS

This application is a continuation of U.S. application Ser. No. 14/348,774, filed Mar. 31, 2014; which is the U.S. national stage application of International Patent Application No. PCT/KR2012/007917, filed Sep. 28, 2012; which claims priority to Korean Application Nos. 10-2011-0099855, 10-2011-0099857, and 10-2011-0099859, filed Sep. 30, 2011, the disclosures of each of which are incorporated herein by reference in their entirety.

TECHNICAL FIELD

The teachings in accordance with exemplary and non-limiting embodiments of this invention relate generally to a camera module.

BACKGROUND ART

Generally, a digital camera module photographs an image using an image sensor such as a photoelectric conversion device of a CCD (Charge Coupled Apparatus) type or a CMOS (Complementary Metal Oxide Semiconductor) type to replace a film.

A camera module using an image sensor is less voluminous and excellent in performance and used in various fields including mobile devices, monitoring cameras and detecting cameras mounted on a vehicle capable of photographing an image. Particularly, the trend is that a camera module used for mobile devices is gradually multifunctional, miniaturized and light-weighted.

Recently, a camera module employed for mobile devices is mounted with an auto-focusing function, and devices forming the camera module must comply with demand for miniaturization of camera module in association with miniaturization of lens and improvement in optical performances. A driving device such as a VCM (Voice Coil Motor) is used for auto focusing function, where the VCM performs the auto focusing function by vertically moving a lens within a predetermined size of space.

Of course, it is possible to use the VCM as a device moving or vibrating a lens or a sensor to a predetermined direction for compensating shaking or trembling.

The camera module thus described, however, suffers from a disadvantage in that soils such as dust and the like are attached on the image sensor or the lens to generate an image failure. Several techniques for correcting this disadvantage are known. One technique typically employed in the camera module for this purpose is disclosed in Korea Registered Patent No. 10-2010-0012010, where a dust trap is arranged about an image sensor.

DETAILED DISCLOSURE

Technical Problem

Accordingly, the present invention has been made keeping in mind the above disadvantages/problems occurring in the prior art, and an object of the present invention is to provide a camera module improved in structure to prevent soils from being generated during operation of camera module

Technical Solution

In order to accomplish the above object, in one general aspect of the present invention, there is provided a camera module, the camera module comprising: a base supporting a filter member mounted on a position corresponding to that of an image sensor mounted on a PCB (Printed Circuit Board); a dust trap unit mounted about the filter member of the base to collect soils including dust introduced into the filter member, wherein the dust trap unit includes an epoxy reception groove formed with one or more ribs formed at a periphery of the filter member mounted at the base, and a dust trap epoxy coated on an inside of the epoxy reception groove.

In some exemplary embodiments, the epoxy reception groove may include a first rib member protruded from an ambience of a window exposing a filter centrally mounted on the base, a second rib member provided at the other surface of the first rib member, a third rib member connected at both distal ends to the first and second rib members and so arranged as to have a first angle relative to the first and second rib members, and a fourth rib member connected at both distal ends to the first and second rib members and so arranged as to have a second angle relative to the third rib member, whereby strength of the base is reinforced, and the dust trap epoxy is coated on a space unit formed by the connection of the first, second, third and fourth rib members.

In some exemplary embodiments, the first angle may be 45°, and the second angle may be 90°.

In some exemplary embodiments, each of the first and second angles may be provided as 90°, and the first/second rib members may be so arranged as to be in parallel with the fourth rib member.

In some exemplary embodiments, depth of the epoxy reception groove may be determined by a lowest height among heights of the first, second, third and fourth rib members.

In some exemplary embodiments, the epoxy reception groove may further have an auxiliary epoxy reception groove having an additional predetermined depth at an inner space unit of the epoxy reception groove.

In another general aspect of the present invention, there is provided a camera module, the camera module comprising: a base mounted with a filter member at a window penetratively formed at a position corresponding to that of an image sensor mounted on a PCB (Printed Circuit Board); and a dust trap unit mounted about the window of the base to collect soils including dust introduced into the filter member, wherein the dust trap unit includes an inclined wall formed at a periphery of the window, an inner wall spaced apart from the inclined wall at a predetermined distance, and protrusively funned toward an upper surface of the base, a space unit formed between the inclined wall and the inner wall, and a dust trap epoxy coated on the space unit.

In some exemplary embodiments, the inclined wall may include a lug unit protrusively formed at the periphery of the window from an upper surface of the base with a distal end being pointed or having a flat surface, and an inclined surface having a height higher than or equal to that of the inner wall, and connecting an upper surface of the lug unit and the upper surface of the base.

In still another general aspect of the present invention, there is provided a camera module, the camera module comprising: a PCB (Printed Circuit Board) mounted with an image sensor; a base mounted at an upper surface of the PCB and mounted with a filter member at a window penetratively formed at a position corresponding to that of an image sensor; a yoke arranged at an upper surface of the base and mounted at an inner surface with a magnet; a bobbin arranged at an inner surface with at least one or more lenses, and lifting in association with interaction with the magnet by a coil wound on a periphery corresponding to the magnet; a bottom elastic member interposed between the base and the yoke to elastically support a bottom surface of the bobbin; a cover coupled to an upper surface of the yoke; an upper elastic member interposed between the yoke and the cover to elastically support an upper surface of the bobbin; and a dust trap unit formed at an ambience of the filter member at the base to collect soils such as dust, wherein the dust trap unit includes an inclined wall formed at a periphery of the window, an inner wall spaced apart from the inclined wall at a predetermined distance with a same height as that of the inclined wall, and protrusively formed upwards of the base, a space unit formed between the inclined wall and the inner wall, and a dust trap epoxy coated on the space unit in a manner of not-overflowing the height of the inclined wall and the inner wall.

In still further general aspect of the present invention, there is provided a camera module, the camera module comprising: a base mounted with a filter member at a window penetratively formed at a position corresponding to that of an image sensor mounted on a PCB (Printed Circuit Board); and a dust trap unit mounted about the window of the base to collect soils including dust introduced into the filter member, wherein the dust trap unit includes a stair unit formed at an ambience of the window with a predetermined depth and width, an inner wall spaced apart from the stair unit and protrusively formed toward an upper surface of the base, and a dust trap epoxy coated on an upper surface between the stair unit of the base and the inner wall.

In some exemplary embodiments, the stair unit may be formed with a thickness thinner than that of the base.

In some exemplary embodiments, the stair unit may include a stair surface formed with a predetermined depth from an upper surface of the base coated with the dust trap epoxy, and a chamfered surface formed at a surface opposite to the filter member in a non-parallel manner with the stair surface.

In some exemplary embodiments, the stair unit may include a stair surface formed with a predetermined depth from an upper surface of the base coated with the dust trap epoxy.

In some exemplary embodiments, the stair surface may be formed in parallel with the base.

In some exemplary embodiments, the stair surface may be formed with a concave groove at an acute angle with the base.

In still further general aspect of the present invention, there is provided a camera module, the camera module comprising: a PCB (Printed Circuit Board) mounted with an image sensor; a base mounted at an upper surface of the PCB and mounted with a filter member at a window penetratively formed at a position corresponding to that of an image sensor; a yoke arranged at an upper surface of the base and mounted at an inner surface with a magnet; a bobbin arranged at an inner surface with at least one or more lenses, and lifting in association with interaction with the magnet by a coil wound on a periphery corresponding to the magnet; a bottom elastic member interposed between the base and the yoke to elastically support a bottom surface of the bobbin; a cover coupled to an upper surface of the yoke; an upper elastic member interposed between the yoke and the cover to elastically support an upper surface of the bobbin; and a dust trap unit formed at an ambience of the filter member at the base to collect soils such as dust, wherein the dust trap unit includes a stair unit formed at an ambience of the window with a predetermined depth and width, an inner wall spaced apart from the stair unit and protrusively formed at a predetermined height toward an upper surface of the base, and a dust trap epoxy coated between the stair unit and the inner wall.

In still further general aspect of the present invention, there is provided a camera module, the camera module comprising: a base mounted at an upper surface of a PCB (Printed Circuit Board) and mounted with a filter member at a window penetratively formed at a position corresponding to that of an image sensor; a yoke arranged at an upper surface of the base and mounted at an inner surface with a magnet; a bobbin arranged at an inner surface with at least one or more lenses, and lifting in association with interaction with the magnet by a coil wound on a periphery corresponding to the magnet; a bottom elastic member interposed between the base and the yoke to elastically support a bottom surface of the bobbin; a cover coupled to an upper surface of the yoke; an upper elastic member interposed between the yoke and the cover to elastically support an upper surface of the bobbin; and a dust trap unit formed at an ambience of the filter member at the base to collect soils such as dust, wherein the dust trap unit includes a stair unit formed at an ambience of the window with a predetermined depth and width, an inner wall spaced apart from the stair unit and protrusively formed at a predetermined height toward an upper surface of the base, and a dust trap epoxy coated between the stair unit and the inner wall.

In some exemplary embodiments, the dust trap unit may be arranged at a bottom surface of a bottom elastic member, wherein an empty space unit is formed between the bottom elastic member and the dust trap unit.

In some exemplary embodiments, the dust trap unit may be arranged at a position not interfered by a bobbin reciprocally mounted at an upper surface of the base.

In some exemplary embodiments, the dust trap unit may be formed at a space unit between a collision position between the base and the bobbin, and the filter member.

Advantageous Effects

A camera module according to the present invention has an advantageous effect in that defects like an image failure caused by movement of dust generated from various parts forming the camera module by drops or shocks, and of foreign objects introduced from an outside to an image sensor or a filter can be prevented.

Another advantageous effect is that a coated area can be partitioned lest a dust trap epoxy coated in a liquid state or semi-solid state be overflowed, whereby a removing process of contaminated ambient parts after being coated can be dispensed with.

Still another advantageous effect is that a reinforcement structure comprised of a plurality of rib members each with a waffle shape or a go board shape is provided to enable an additional performance of reinforcing a structural strength of a base relatively thinner than other parts.

BRIEF DESCRIPTION OF THE DRAWINGS

The teachings of the present invention can be readily understood by considering the following detailed description in conjunction with the accompanying drawings, in which:

FIGS. 6 and 7 are cross-sectional views of FIG. 5;

BEST MODE

Now, the camera module according to exemplary embodiments of the present invention will be described in detail with reference to the accompanying drawings.

Figure 1:
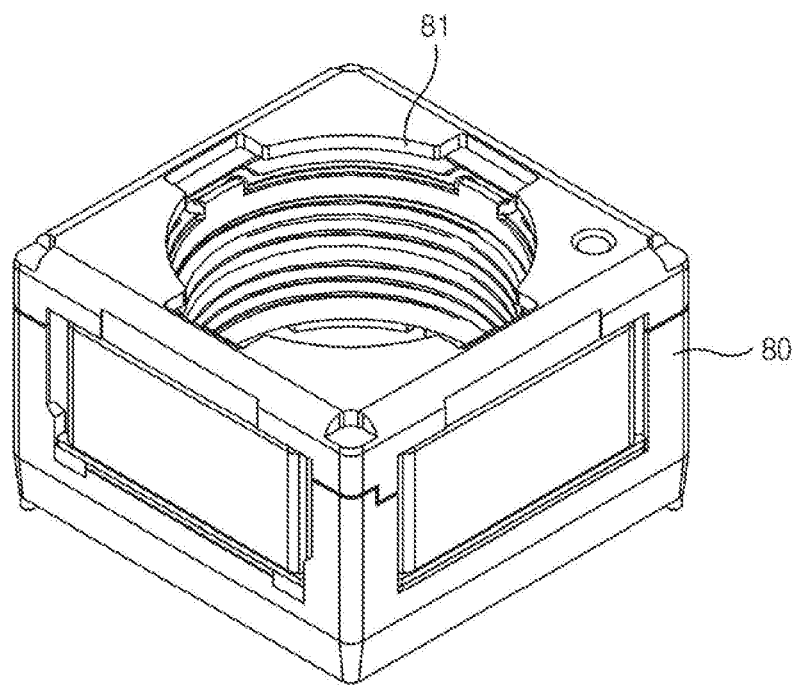
FIG. 1 is a perspective view illustrating a camera module according to an exemplary embodiment of the present invention.
Figure 2:
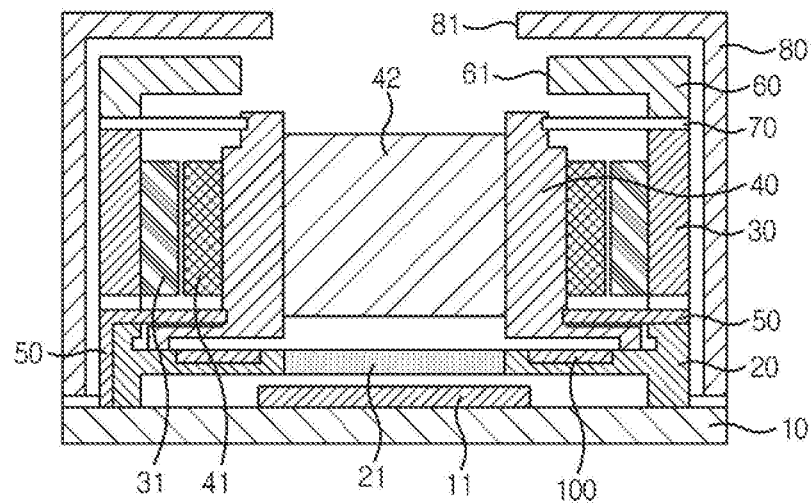
FIG. 2 is a schematic view of FIG. 1.
Figure 3:
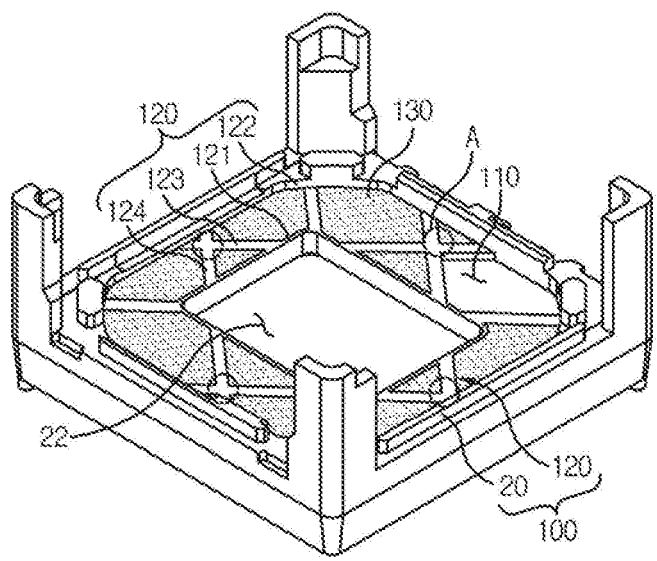
FIG. 3 is a perspective view illustrating a base having a waffle structure according to a first exemplary embodiment of the present invention.
Figure 4:
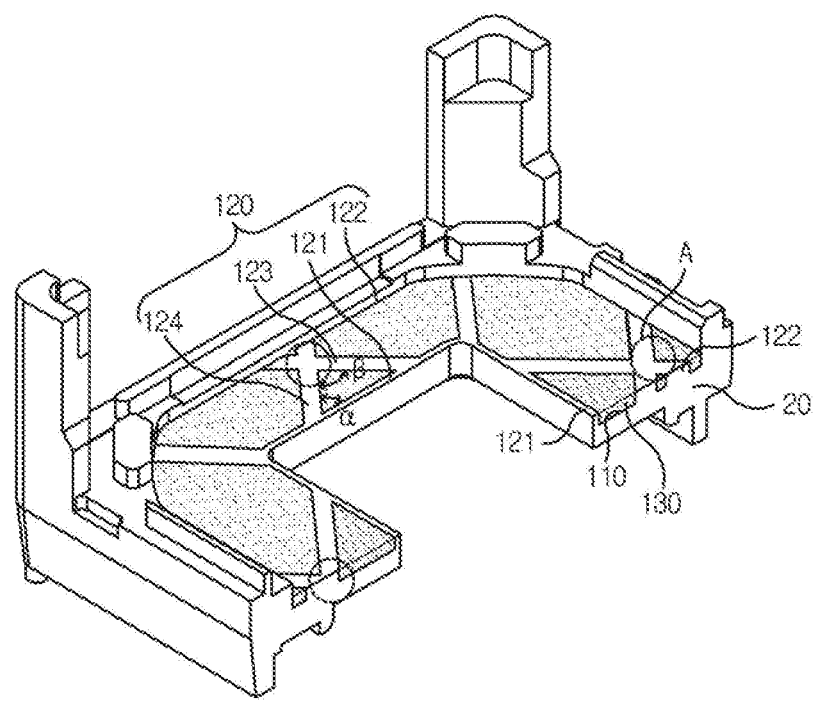
FIG. 4 is a partially cut-out cross-sectional view of FIG. 3.

FIG. 1 is a perspective view illustrating a camera module according to an exemplary embodiment of the present invention, FIG. 2 is a schematic view of FIG. 1, FIG. 3 is a perspective view illustrating a base having a waffle-like structure (with criss-crossing rib members) according to a first exemplary embodiment of the present invention, and FIG. 4 is a partially cut-out cross-sectional view of FIG. 3.

The camera module according to FIG. 1 illustrates an example of using a VCM as an auto focus unit, where the camera module is provided being wrapped at an outside by a shield can (80) of a metal material and is centrally provided with around through hole (81) to receive an outside light, where an image is received through the through hole (81).

FIG. 2 is a schematic cross-sectional view of a camera unit according to an exemplary embodiment of the present invention, where a schematic cross-section of FIG. 1 is illustrated.

As illustrated in the drawings, the camera unit according to an exemplary embodiment of the present invention includes a PCB (10), a base (20), a yoke (30), a bobbin (40), a bottom elastic member (50), a cover member (60) and an upper elastic member (70). The camera unit according to the exemplary embodiment of the present invention may further include a shield can (80), if necessary. Although the exemplary embodiments of the present invention illustrated in FIGS. 1 and 2 have disclosed a camera module included with the shield can (80), the present invention is not limited thereto, and therefore, the shield can (80) may be omitted depending on types and kinds of electronic products or camera modules.

The PCB (10) is mounted at an approximate center thereof with an image sensor (11) capturing an image introduced into the through hole (81). Although not illustrated, a controller may be provided that includes a power unit for supplying an electric power to the bobbin (40).

The base (20) is mounted at an upper surface of the PCB (10), and is mounted with a filter member (21) at an approximate center thereof. The filter member (21) is provided at a position corresponding to that of the image sensor (11) to filter an image introduced through the through hole (81). Furthermore, the base (20) is formed with a window (22, See FIG. 3) having a size smaller than that of the image sensor (11) to allow the filter member (21) to be exposed. The yoke (30) is mounted at an upper surface of the base (20), and formed thereinside with a magnet (31) to generate a magnetic field.

The bobbin (40) is wound by a coil (41), and the wound position of the coil corresponds to that of a magnet (31) mounted on the yoke (30), where the coil forms an electromagnetic field. The bobbin (40) is formed thereinside with a lens (42), and by up/down movement of the bobbin (40) caused by the electromagnetic field formed by the coil (41) and interaction of the magnet (31), the lens (42) allows an incident image to be focused on the image sensor (11).

The bottom elastic member (50) serves to elastically support the bobbin (40), and is interposed between the yoke (30) and the base (20). As illustrated in FIG. 2, a distal end is bent to be conductibly connected to the PCB (10) to supply a power to the coil (41) side. The cover member (60) is arranged at an upper surface of the yoke (30), and centrally provided with a via hole (61) at a position corresponding to that of the through hole (81). The upper elastic member (70) is interposed between the cover member (60) and the yoke (30) to elastically support upwards of the bobbin (40). As mentioned above, the shield can (80) may be provided in an approximate hexahedron with a metal material, and is centrally and penetratively formed with a through hole (81), through which an image can be transmitted to the image sensor (11) side. However, the shield can (80) may be omitted depending on types of the camera module.

In the camera module mounted with a conventional VCB as an auto focus unit according to the present invention, the bobbin (40) performs the auto focusing operation by reciprocal movement to the base in association with interaction between the coil (41) and the magnet (31). Thus, the bobbin (40) and the base (20) repetitively collide amidst the auto focusing operation. However, if the collision is repeated for a long time, a contact portion between the base (20) and the bobbin (40), or a body forming the bobbin (40) or the base (20) may receive a repetitive load to generate a pollutant material like fine particles.

Furthermore, the present invention is characterized by configuration of a dust trap unit (100) for prevention of formation of black spots caused by drops, on the filter member (21), of fine particles separated from surfaces of constituent parts by outside shocks or foreign objects like dust introduced from outside. Meanwhile, description of detailed construction and operation of the VCM will be omitted due to being less relevant to the subject matter of the present invention.

Referring to FIGS. 2 to 4, the dust trap unit (100) according to a first exemplary embodiment of the present invention includes an epoxy reception groove (110), a diaphragm (120) and a dust trap epoxy (130).

The epoxy reception groove (110) is provided at an upper surface of the base (20) in a concave groove shape with a predetermined depth, and preferably, a plurality of epoxy reception grooves (110) is formed near to the window (22) penetratively formed at a center of the base (20). The depth of the epoxy reception groove (110) is determined by a height of the diaphragm (120) partitioning the plurality of epoxy reception grooves (110), and if necessary, it is possible to form the epoxy reception groove (110) on an inner floor surface of the diaphragm (120).

Preferably, the diaphragm (120) is integrally formed with the base (20). If necessary, the diaphragm (120) may be provided in a separate member, and may be also attached to the upper surface of the base (20). The diaphragm (120) is protrusively formed from the base (20) at a predetermined height, where the height of the diaphragm (120) may be same as the depth of the epoxy reception groove (110). However, the present invention is not limited thereto. For example, an additional groove is formed at an inner surface of the diaphragm (120) to form the epoxy reception groove (110), where a depth of the newly formed groove becomes the depth of the epoxy reception groove (110). The diaphragm (120) according to an exemplary embodiment of the present invention includes first to fourth rib members (121~124) as shown in FIGS. 1 to 4.

The first rib member (121) is protrusively formed on an edge of the window (22), and the second rib member (122) is the other side of the first rib member (121), which is the outmost side of an upper surface of the base (20) and a part of the inner surface of the base (20) as well. In this case, the second rib member (12) is not a separate member but a conversion from the part of the base (20), such that there is no need of a separate adhesive or a separate forming process. Of course, the second rib member may be provided by a separate member.

Each distal end of the third rib member (123) is respectively connected to the first rib member (121) and the second rib member (122), and a space unit formed by connection of the first, second and third rib members (121, 212, 123) may be provided as the epoxy reception groove (110). Meanwhile, each of the first, second and third rib members (121, 122, 123) preferably has a same height. However, the present invention is not limited thereto, and the heights of the first, second and third rib members (121, 122, 123) may be different. The heights of the first, second and third rib members (121, 122, 123) may be adjusted within a design-allowable scope, and preferably, the first rib member (121) is the highest. Furthermore, the heights of second and third rib members (122, 123) may be equal to or lower than that of the first rib member (121). The third rib member (123) is so arranged as to have a first angle (α) relative to the first or second rib member (121, 122).

Each distal end of the fourth rib member (124) is respectively connected to the first rib member (121) and the second rib member (122), as in the case of the third rib member (123), and the fourth rib member (124) is so arranged as to have a second angle (β) relative to the third rib member (123).

Preferably, the first angle (α) is provided at 45°, and the second angle is provided at 90° according to the exemplary embodiment of the present invention, whereby a space unit formed by connection of the first to fourth rib members (121~124) may be arranged in a gridded waffle shape as the epoxy reception groove (110).

Although not illustrated, in a case both the first and second angles (α,β) are formed at 90°, the first, second and fourth rib members (121, 122, 123) are arranged in parallel while the third rib member (123) is formed at a right angle thereto, whereby the first to fourth rib members (121-124) may be provided with an approximate go board shape to form a square-patterned epoxy reception groove (110).

In a case the epoxy reception groove (110) is formed by configuration of the first to fourth rib members (121~124), the strength of the base (20) can be reinforced by the configuration of the first to fourth rib members (121~124) to withstand the repetitive shocks of the bobbin (40).

Meanwhile, as illustrated in FIG. 2, the dust trap unit (100) may preferably be arranged at a bottom surface of the bottom elastic member (50), whereby an empty space unit is formed between the bottom elastic member (50) and the dust trap unit (100). Preferably, the dust trap unit (100) is arranged at a position not interfered by the bobbin (40).

That is, the dust trap unit (100) is preferably ruled out from a collision surface (A, See FIGS. 3 and 4) between the bobbin and the base, and to this end, the collision surface (A) is preferably arranged above the plurality of rib members (121~124).

Of course, although not illustrated, the collision surface (A) may be formed by an inner surface of the epoxy reception groove (110) formed by the rib members (121~124). However, in this case, preferably, the epoxy reception groove (110) formed with the collision surface is not coated with the dust trap epoxy (130).

According to the present invention thus constructed, the plurality of rib members (121~124) may be integrally formed with the base (20), or the epoxy reception groove (110) may be additionally formed on a floor surface of the base (20) at a predetermined depth to reinforce the structural strength of the base (20) provided in a thin flat plate, compared with the other constituent parts.

Furthermore, the epoxy reception groove (110) is provided by the diaphragm (120) at a predetermined depth, such that liquid or semi-solid dust trap epoxy (130) inserted into the epoxy reception groove (110) is prevented from overflowing or being leaked to contaminate other ambient parts such as the filter member (21), for example.

Figure 5:
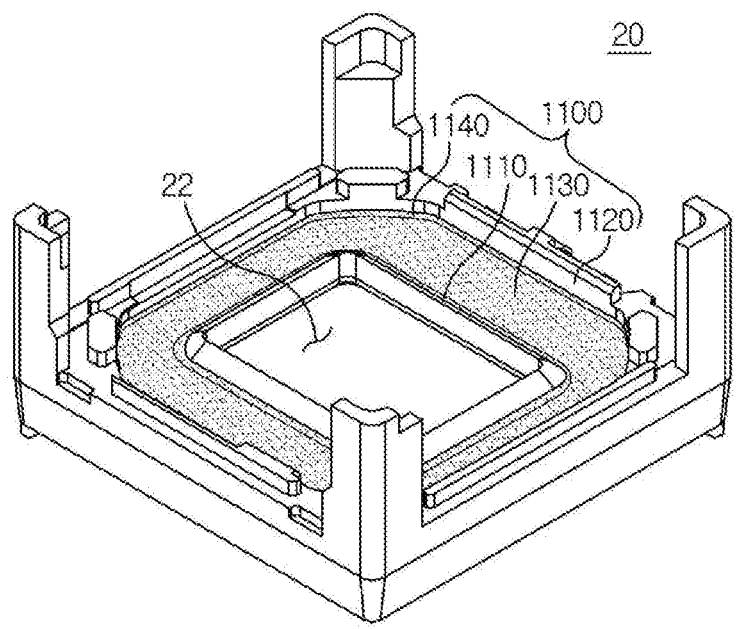
FIG. 5 is a perspective view illustrating a base having a stair structure according to a second exemplary embodiment of the present invention.

Referring to FIGS. 5 to 7, a dust trap unit (1100) according to the second exemplary embodiment of the present invention includes an inclined wall (1110), an inner wall (1120), a space unit (1130) and a dust trap epoxy (1140).

The inclined wall (1110) is formed at a surrounding area of a window (22) formed with the filter member (21, See FIG. 2) formed on the base (20) and includes a lug unit (1111) and an inclined surface (1112).

The lug unit (1111) is protrusively formed from an upper surface of the base (20), and a distal end may be directly connected to the inclined surface (1112) as shown in FIG. 6, or may be connected to the inclined surface (1112) by being provided with a flat surface (1112a) parallel with the base (20), as illustrated in FIG. 7.

Although one end of the inclined surface (1112) is a distal end of the lug unit (1111) and connected to the flat surface (1112a), and the other end is connected to the upper surface of the base (20) at a predetermined angle. The angle of the inclined surface (1112) may be variably prepared if necessary. However, an angle formed by the upper surface of the base (20) and the inclined surface (1112) is preferably 90° or an obtuse angle as illustrated in FIGS. 5 to 7. If the inclined surface (1112) is provided at an obtuse angle as illustrated in FIGS. 5 to 7, a slope-shaped hill having a predetermined thickness may be formed.

The inner wall (1120), which is an opposite side of the inclined wall (1110), is protrusively formed at the protruded upper surface of the base (20), and according to the exemplary embodiment of the present invention, the inclined wall (1110) and the inner wall (1120) are preferably formed with a substantially equal height.

The space unit (1130) is formed between inclined wall 1110) and the inner wall (1120), and a depth of the space unit (1130) is determined by a protruded height of the inclined wall (1110).

The dust trap epoxy (1140) of liquid or semi-solid shape is preferably coated on an interior of the space unit (1130) in a non-overflowing manner over the inclined wall (1110) and the inner wall (1120). The dust trap epoxy (1140) may be coated along an inner surface of the space unit (1130) with a very thin thickness, or coated with a thick thickness to have a predetermined depth as shown in FIGS. 5 and 6.

Meanwhile, referring to FIG. 2, the dust trap unit (1100) may preferably be arranged at a bottom surface of the bottom elastic member (50), whereby an empty space unit is formed between the bottom elastic member (50) and the dust trap unit (100). Preferably, the dust trap unit (100) is arranged at a position not interfered by the bobbin (40).

As apparent from the foregoing, the inclined wall (1110) and the inner wall (1120) are so structured as to be integrally formed with the base (20) to prevent the dust trap epoxy (1140) from overflowing in the coating process. Thus, other ambient parts, for example, the filter member (21) is prevented from being contaminated by overflow or leak of the liquid or semi-solid dust trap epoxy (1140) inputted into the space unit (1130). Furthermore, the inclined surface (1112) is so formed as to allow the inclined wall (1110) to have a predetermined angle, and protruded to have a predetermined thickness at an ambience of the window (22), such that the configuration of the inclined wall (1110) reinforces the strength of the case (20) to prevent the case (20) from being deformed or twisted.

Mode for Invention

Figure 8:
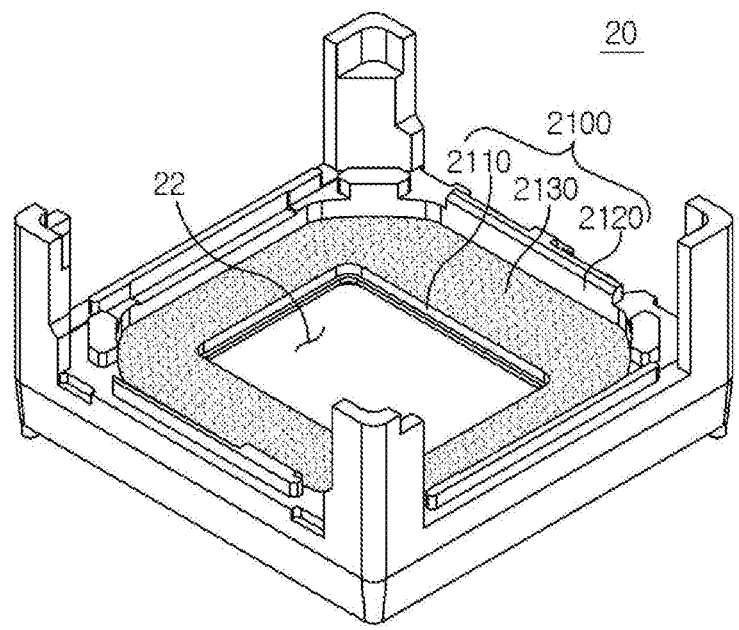
FIG. 8 is a perspective view illustrating a base having a stair structure according to a third exemplary embodiment of the present invention.
Figure 9:
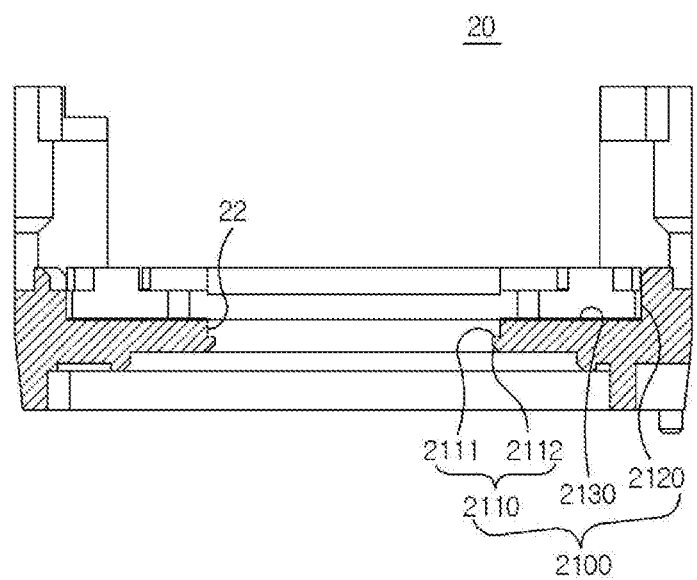
FIGS. 9, 10 and 11 are cross-sectional views of FIG. 8

Referring to FIGS. 8 and 9, the dust trap unit (2100) according to the third exemplary embodiment of the present invention includes a stair unit (2110), an inner wall (2120) and a dust trap epoxy (2130). The stair unit (2110) is so formed as to have a predetermined depth and width at an ambience of the window (22). According to the exemplary embodiment of the present invention, the stair unit (2110), as shown in FIG. 9, is preferably formed to have a thickness thinner than that of the base (20).

Furthermore, the stair unit (2110) preferably includes a stair surface (2111) formed with a predetermined depth from an upper surface of the base (20) coated with the dust trap epoxy (2130), and a chamfered surface (2112) formed at a surface opposite to the filter member (21, See FIG. 2) in a non-parallel manner with the stair surface (2111).

Figure 10:
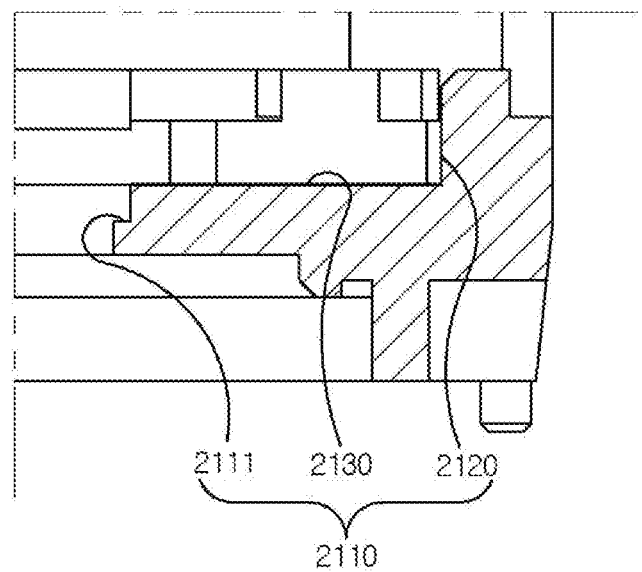
Figure 11:
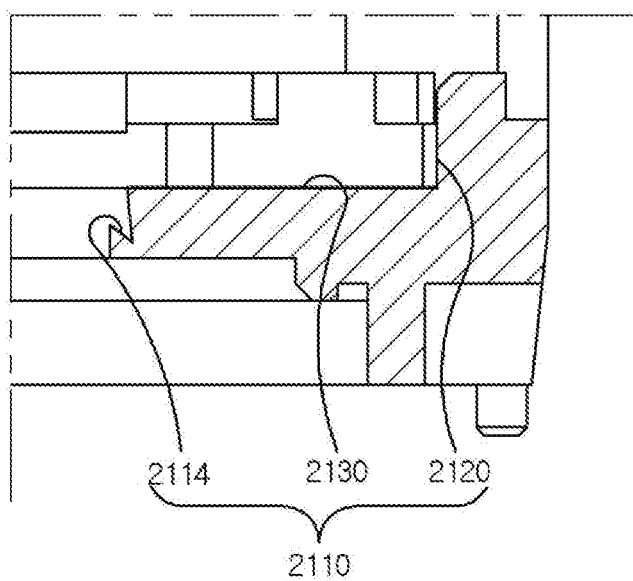

According to another exemplary embodiment of the present invention, the stair unit (2110) may be provided only with a stair surface (2111) that is formed in parallel with the base (20), as shown in FIG. 10 or may be formed with a stair surface (2114) formed with a concave groove at an acute angle with the base (20), as illustrated in FIG. 6. The inner wall (2120) is positioned at an opposite side of the stair unit (2110) to be protrusively formed at a predetermined height on an exposed upper surface of the base (20).

The dust trap epoxy (2130) is provided in a liquid or semi-solid state to be coated on an upper surface between the stair unit (2110) of the base (20) and the inner wall (2120) Preferably, the coating is made not too thick exceeding a predetermined thickness but in a thin thickness. In a case the dust trap epoxy (2130) is provided in a liquid state and coated in a too thick thickness, there is a fear of the dust trap epoxy (2130) overflowing the stair unit (2110).

Meanwhile, as illustrated in FIG. 2, the dust trap unit (2100) is arranged at a bottom surface of a bottom elastic member (50), wherein an empty space unit is formed between the bottom elastic member (50) and the dust trap unit, and preferably, the dust trap unit (2100) is arranged at a position not interfered by bobbin (40).

As apparent from the foregoing, the present invention is advantageously configured that the stair unit (2110) is arranged at an ambience of the window (22, See FIG. 3) to allow the stair surface (2111) of the stair unit (2110) to perform a buffering function and to prevent the filter member (21, See FIG. 2) from being directly contaminated by the exposed dust trap epoxy (2130), even if the dust trap epoxy (2130) coated on an upper surface of the base (20) is overflowed or leaked. Furthermore, even if the dust trap epoxy (2130) overflows over the stair surface (2111), the chamfered surface (2112) formed at the other surface of the stair surface (2111) can accommodate a predetermined portion of the overflown dust trap epoxy (2130), whereby the filter member (21), an effective image forming unit, is prevented from being directly contaminated.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The camera module according to the present invention has an industrial applicability in that it can be applied to a small-sized camera module mounted on a small electronic device such as a portable terminal, and a tablet PC.

What is claimed is:

1. A camera module, the camera module comprising:
   a printed circuit board (PCB);
   an image sensor disposed on the printed circuit board;
   a base disposed on the printed circuit board;
   a filter member disposed at a window penetratively formed at the base;
   a first wall upwardly protruded from an upper surface of the base and formed at a periphery of the window;
   a second wall upwardly protruded from the upper surface of the base and spaced from the first wall;
   a space unit formed on the upper surface of the base between the first wall and the second wall, wherein a depth of the space unit is determined by a protruded height of the first wall; and
   a dust trap disposed in the space unit,
   wherein the first wall includes an inclined surface gradually upwardly protruded from an inner side of the first wall to an outer side of the first wall and an upright surface to form an inner circumference of the window,
   wherein distal ends of the inclined surface and the upright surface meet at a predetermined angle, and
   wherein a flat surface is formed between a lower end of the inclined surface and an inner surface of the second wall.

2. The camera module of claim 1, wherein the inclined surface of the first wall is inclined toward an inner side of the base.

3. The camera module of claim 1, wherein the first wall further includes a lug unit formed at the periphery of the window, upwardly protruded from the upper surface of the base and connected to the inclined surface.

4. The camera module of claim 1, wherein the first wall includes a flat surface at an upper end between the inclined surface and the upright surface thereof, and
   wherein the flat surface is parallel with the upper surface of the base.

5. The camera module of claim 1, wherein the first wall has a height lower than that of the second wall.

6. The camera module of claim 1, wherein the first wall has a height equal to that of the second wall.

7. The camera module of claim 1, wherein the dust trap is coated on an interior of the space unit and has a height lower than that of the first wall.

8. The camera module of claim 1, further comprising:
a yoke disposed on the second wall of the base;
a bobbin disposed at an inner side of the yoke and coupled with a lens;
a magnet disposed on the yoke; and
a coil disposed on the bobbin to interact with the magnet.

9. The camera module of claim 8, wherein a portion of the bobbin is overlapped with the first wall in a direction of an optical axis of the lens coupled to the bobbin.

10. The camera module of claim 8, wherein the bobbin includes a body unit coupled with a lens, a first extension unit outwardly extended from the body unit, and a second extension unit downwardly extended from the first extension unit; and
 wherein a bottom end of the second extension unit is disposed at an outer side of the dust trap.

11. A camera module, the camera module comprising:
a base mounted with a filter member at a window penetratively formed at a position corresponding to that of an image sensor mounted on a PCB (Printed Circuit Board);
a dust trap disposed on an upper surface of the base to collect soils including dust introduced into the filter member;
a first wall upwardly protruded from the upper surface of the base and disposed at an inner side of the dust trap; and
a second wall upwardly protruded from the upper surface of the base and disposed at an outer side of the dust trap,
wherein the first wall includes an inclined surface gradually upwardly protruded from an inner side of the first wall to an outer side of the first wall and an upright surface to form an inner circumference of the window,
wherein distal ends of the inclined surface and the upright surface meet at a predetermined angle, and
wherein a flat surface is formed between a lower end of e inclined surface and an inner surface of the second wall to form a space a unit.

12. The camera module of claim 11, wherein the inclined surface of the first wall is inclined toward an inner side of the base.

13. The camera module of claim 11, wherein the first wall further includes a lug unit formed at the periphery of the window, upwardly protruded from the upper surface of the base and connected to the inclined surface.

14. The camera module of claim 11, wherein the first wall includes a flat surface at an upper end between the inclined surface and the upright surface thereof, and
 wherein the flat surface is parallel with the upper surface of the base.

15. The camera module of claim 11, wherein the first wall has a height lower than that of the second wall.

16. The camera module of claim 11, wherein the dust trap is coated on the flat surface and over the inclined surface and has a height lower than that of the first wall.

17. The camera module of claim 11, further comprising:
a yoke disposed on the second wall of the base;
a bobbin disposed at an inner side of the yoke;
a magnet disposed on the yoke; and
a coil disposed on the bobbin.

18. The camera module of claim 17, wherein a portion of the bobbin is overlapped with the first wall in a direction of an optical axis of a lens coupled to the bobbin.

19. The camera module of claim 17, wherein the bobbin includes a body unit coupled with a lens, a first extension unit outwardly extended from the body unit, and a second extension unit downwardly extended from the first extension unit, and
 wherein a bottom end of the second extension unit is disposed at an outer side of the dust trap.

20. An optical apparatus, the optical apparatus comprising the camera module of claim 1.

* * * * *